United States Patent [19]

Kurakake et al.

[11] Patent Number: 4,837,487
[45] Date of Patent: Jun. 6, 1989

[54] SYSTEM FOR COUPLING A VISUAL SENSOR PROCESSOR AND A ROBOT CONTROLLER

[75] Inventors: Mitsuo Kurakake; Hideo Miyashita; Shoichi Otsuka, all of Hino, Japan

[73] Assignee: Fanuc Ltd., Minamitsuru, Japan

[21] Appl. No.: 113,344

[22] Filed: Oct. 26, 1987

Related U.S. Application Data

[63] Continuation of Ser. No. 795,938, Oct. 17, 1985.

[30] Foreign Application Priority Data

Feb. 22, 1984 [JP] Japan ............................ 59-32019

[51] Int. Cl.$^4$ ............................................. G05B 19/18
[52] U.S. Cl. .............................. 318/568.16; 364/134; 364/513; 901/9; 901/47
[58] Field of Search ............... 318/568, 640; 364/134, 364/513; 901/6, 9, 46, 47; 382/41, 48, 65; 414/5

[56] References Cited

U.S. PATENT DOCUMENTS

| | | | |
|---|---|---|---|
| 4,146,924 | 3/1979 | Birk et al. | 318/640 X |
| 4,215,397 | 7/1980 | Horn | 364/134 X |
| 4,215,398 | 7/1980 | Burkett | 364/134 X |
| 4,380,696 | 4/1983 | Masaki | 364/513 X |
| 4,412,121 | 10/1983 | Kremers et al. | 318/577 X |
| 4,445,174 | 4/1984 | Fletcher | 364/134 X |
| 4,550,366 | 10/1985 | Toyama | 364/134 X |
| 4,584,704 | 4/1986 | Ferren | 382/65 |
| 4,630,225 | 12/1986 | Hisano | 364/513 X |
| 4,665,551 | 5/1987 | Sternberg et al. | 382/41 X |
| 4,731,860 | 3/1988 | Wahl | 382/41 |

FOREIGN PATENT DOCUMENTS 8203934  11/1982  World Int. Prop. O. ........ 364/513

OTHER PUBLICATIONS

C. F. Ruoff, "PACS—An Advanced Multitasking Robot System", The Industrial Robot, Jun. 1980, pp. 87–98.

Primary Examiner—Bentsu Ro
Attorney, Agent, or Firm—Staas & Halsey

[57] ABSTRACT

A system for coupling a visual sensor processor (B) and a robot controller (A), so that the processing of the whole system is sped up and the configuration of the system is low-cost. To this end, the visual sensor processor (B) and the robot controller (A) are coupled together via a bidirectional high-speed data transfer channel (10, 28, $l_1$, $l_2$) for an exchange therebetween of required information. A nonvolatile memory (6) and a serial interface (12) for connection to an external input-/output device, are installed in the robot controller (A), and are shared by the visual sensor processor (B) and the robot controller (A) through utilization of the channel.

2 Claims, 3 Drawing Sheets

SYSTEM FOR COUPLING A VISUAL SENSOR PROCESSOR AND A ROBOT CONTROLLER

This is a continuation of co-pending application Ser. No. 795,938 filed on Oct. 17, 1985, now abandoned.

BACKGROUND OF THE INVENTION

The present invention relates to a system for coupling a visual sensor processor and a robot controller.

Generally, in a system which comprises a visual sensor processor and a robot controller in combination, the robot controller provides object specifying information (for example, a workpiece number), work specifying information (for instance, an instruction for computing the position or the like of an object), etc. to the visual sensor processor via an RS-232C interface (having a transmission rate of 4800 bauds), and the visual sensor processor, supplied with such information, sends back an ACK signal to the robot controller and, at the same time, executes the specified processes and then sends required position information and so forth to the robot controller via the above mentioned interface. The robot controller responds to the information to control the movement of a hand or the like to grip a workpiece, for example.

One problem of such a system is that a relatively large amount of time is needed until required information is supplied to the robot controller after issuing therefrom a command to the visual sensor processor. Another problem is that the system configuration is appreciably expensive.

SUMMARY OF THE INVENTION

An object of the present invention is to increase the processing speed of the combination visual sensor processor-robot controller system and to make the system configuration less expensive.

The present invention is directed to a system for coupling a visual sensor processor which converts an image signal of a camera to digital information, extracts therefrom image information of an object and recognizes its position, shape, etc. and a robot controller which controls the movement of a robot based on the results of recognition by the visual sensor processor. The visual sensor processor and the robot controller are coupled together via a bidirectional high-speed data transfer channel for an exchange therebetween of required information. Furthermore, a nonvolatile memory for storing various programs and a serial interface for connection with an external input/output device, are installed in the robot controller, and are shared between the units through utilization of the high-speed data transfer channel.

DETAILED DESCRIPTION OF THE PREFERRED EMBODIMENTS

Figure 1:
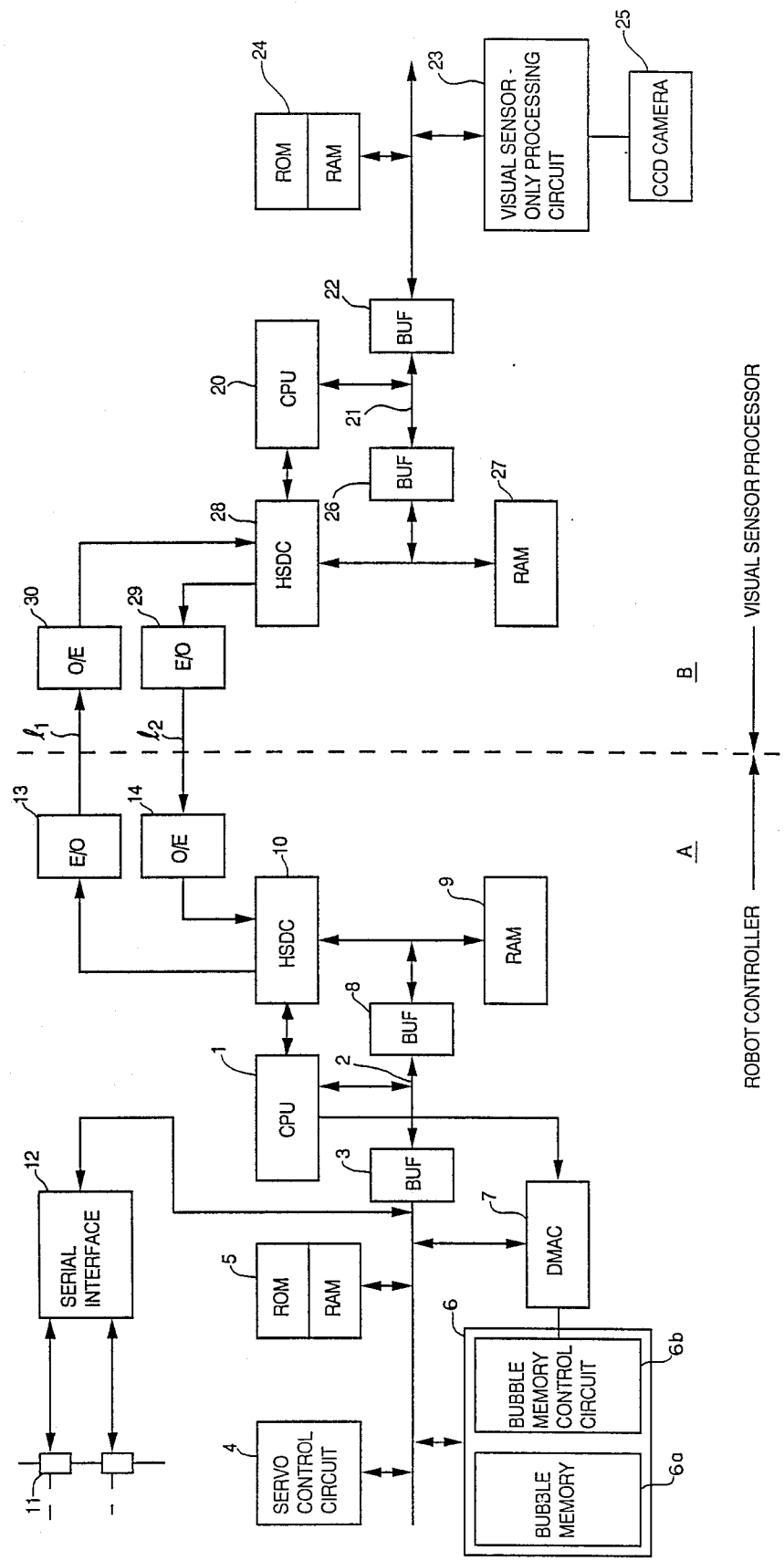
FIG. 1 is a block diagram of an embodiment of the present invention.

In FIG. 1, reference character A indicates a robot controller and B a visual sensor processor, both of which are interconnected via optical data communication lines $l_1$ and $l_2$. It is also possible to share one optical data communication line as forward and backward channels between the units.

The robot controller A includes a microprocessor 1 and a servo control circuit 4, a memory 5 including a ROM and a RAM, an external memory 6 composed of a nonvolatile memory, for example, a bubble memory 6a and its control circuit 6b, a direct memory access control circuit (hereinafter referred to as the DMAC) 7 and an RS-232C serial interface 12 connected to a connector 11 for connection with a printer, an ASCII terminal, a keyboard, etc., these components being connected via a buffer 3 to a bus 2 of the microprocessor. The robot controller further includes a transfer RAM 9 having a transmission area, and a reception area, and a high-speed serial data transmission channel (hereinafter referred to as an HSDC) 10 for effecting a serial data transmission in both directions between the robot controller and the visual sensor processor B, which are connected via a buffer 8 to the bus 2. An electro-opto transducer 13 and an opto-electro transducer 14 both connected to the HSDC 10.

The visual sensor processor B includes a microprocessor 20, a visual sensor-only processing circuit 23 and a memory 24 including a ROM and a RAM, which are connected via a buffer 22 to a bus 21 of the microprocessor. A CCD camera 25 is connected to the visual sensor-only processing circuit 23. The visual sensor processor further includes a transfer RAM 27 having a transmission area and a reception area, and an HSDC 28 for effecting a serial data transmission in both directions between the visual sensor processor B and the robot controller A, which are connected via a buffer 26 to the bus 21. An electro-opto transducer 29 and an opto-electro transducer 30 are both connected to the HSDC 28. The HSDCs 10 and 28 transfer data, for instance, at 1 to 2 Mbaud rates.

An execution program and initial data of the microprocessor 1 necessary for the execution of predetermined control by the robot controller A and an execution program and initial data necessary for the execution of predetermined control by the visual sensor processor B, are initially stored in the bubble memory 6a. The loading of the execution programs and the setting of the initial data including various parameters at the time of turning ON the power source, are carried out in the following manner. At first, the microprocessor 1 executes a loading program stored in the ROM of the memory 5 to start the DMAC 7, by which the execution programs and the initial data for the microprocessor 1 and 20 stored in the bubble memory 6a are transferred to the RAM of the memory 5. Next, the execution program and the initial data for the microprocessor 20, thus transferred to the RAM, are sequentially read out therefrom and stored in the transmission area of the transfer RAM 9 via the buffer 8, after which the initial data is applied to the HSDC 10, thereby starting it. The contents of the transmission area of the transfer RAM 9 are read out by the HSDC 10 and converted by the electro-opto transducer 13 to an optical signal for transmission over the optical data communication line $l_1$. The signal is converted by the opto-electro transducer 30 and is stored by the HSDC 28 in the reception area of the transfer RAM 27. On the other hand, the microprocessor 20, when supplied with power, executes a loading program stored in the ROM of the memory 24 to start the HSDC 28 and, at the same time, reads via the buffer 26 the execution program and the initial data of its own transferred to the reception area of the transfer RAM 27, and stores them in the RAM of the memory 24.

Next, data input from a keyboard (not shown) connected via the connector 11 to the robot controller A is preceded by entering a command by which the microprocessor 1 recognizes that the subsequent data is directed to the robot controller A. Also data input to the visual sensor processor B from the keyboard is preceded by entering a command by which the microprocessor 1 recognizes that the subsequent data is directed to the visual sensor processor B. In the event that the input data is intended for the visual sensor processor B, the microprocessor 1 writes the input data into the transmission area of the transfer RAM 9 and transfers its contents by means of the HSDCs 10 and 28 to the reception area of the transfer RAM 27. The microprocessor 20 recognizes the information from the keyboard by reading out the data from the reception area of the transfer RAM 27. This is also true for the cases of entering data to the robot controller A and the visual sensor processor B through use of other input means. On the other hand, for data output from the robot controller A to a printer (not shown) connected to the connector 11, the microprocessor 1 first reads out of the memory 5 the data to be output and then provides it to the serial interface 12. In the case of outputting data from the visual sensor processor B, the microprocessor 20 first reads out of the memory 24 the data to be output and then writes it in the transmission area of the transfer RAM 27. Then the contents of the transmission area of the transfer RAM 27 are read out by the HSDC 28 and its output is converted by the electro-opto transducer 29 to an optical signal for transmission over the optical data communication line $l_2$. The signal thus transmitted is converted by the opto-electro transducer 14 to an electrical signal, which is stored by the HSDC 10 in the reception area of the transfer RAM 9. The microprocessor 1 reads out the data and outputs it to the serial interface.

When the robot controller A issues an object specifying command such as a workpiece number and a work specifying command such as a command for computing the position of an object, to the visual sensor processor B, the microprocessor 1 writes the commands in the transmission area of the transfer RAM 9, and the microprocessor 20 reads out the commands transferred to the reception area of the transfer RAM 27 in such a manner as described above. The results of recognition obtained by converting the output of the CCD camera 25 to digital information through the visual sensor-only processing circuit 23 (i.e., extracting image information of the object contained in the converted information and computing the position, shape or the like, in response to the above commands), are written by the microprocessor 20 into the transmission area of the transfer RAM 27. The microprocessor 1 reads out the results of recognition which are transferred to the reception area of the transfer RAM 9, as described above, and judges the position, posture, etc. of the object from the results of recognition. Then the microprocessor 1 controls the movement of a hand or the like via the servo control circuit 4.

Figure 2:
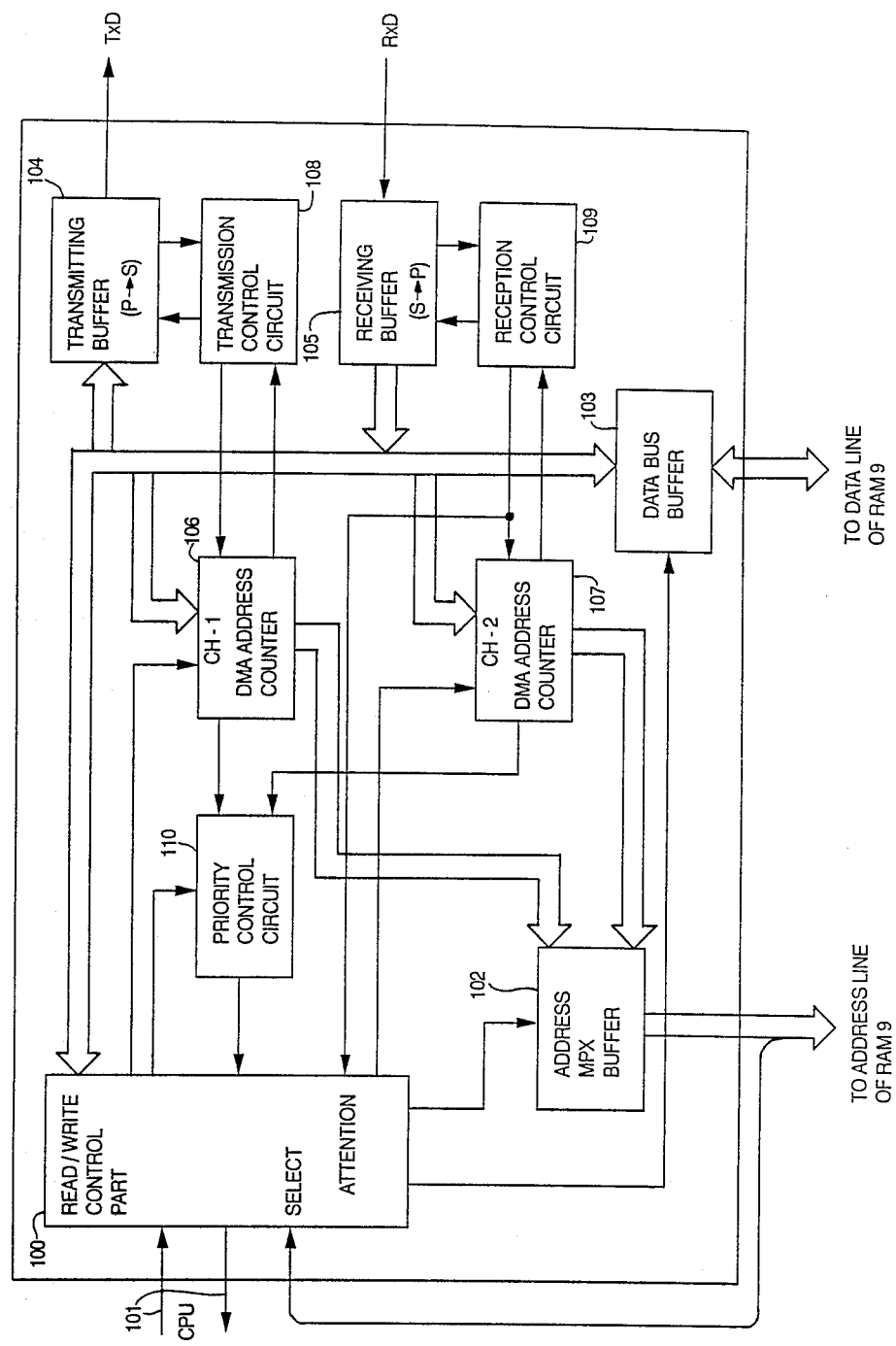
FIG. 2 is a block diagram of an example of an HSDC 10.

FIG. 2 is a block diagram of an example of the HSDC 10. The HSDC 28 can also be implemented by the same construction.

In FIG. 2 a read/write control part 100 is connected to a control line 101 of the microprocessor 1; an address MPX buffer 102 is connected to an address line of the transfer RAM 9; a data bus buffer 103 is connected to a data line of the transfer RAM 9; a transmitting buffer 104 is connected to the electro-opto transducer 13; and a receiving buffer 105 is connected to the opto-electro transducer 14.

The read/write control part 100 is started under control of the microprocessor 1 and controls the HSDC 10. The read/write control part 100 also performs a data transfer from the transmission area of the transfer RAM 9 to the transmitting buffer 104, and a data transfer from the receiving buffer 105 to the reception area of the transfer RAM 9.

Figure 3:
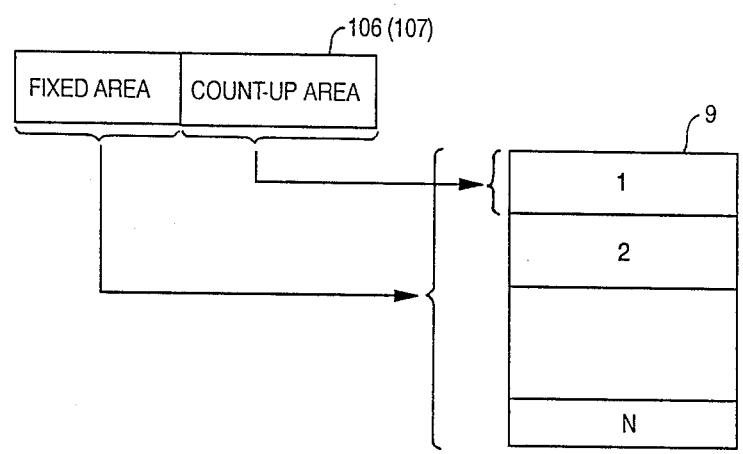
FIG. 3 is a diagram for explaining the operation of DMA address counters 106 and 107.

DMA address counters 106 and 107 determine which areas of the transfer RAM 9 are used as the transmission area and the reception area, and create addresses for the DMA. The counter 106 is used for transmission and the counter 107 for reception. For example, as depicted in FIG. 3, each counter is composed of a fixed area and a count-up area. The fixed area is to specify the leading address of one of N areas into which the entire area of the transfer RAM 9 is divided. By the initialization from the microprocessor 1, certain data is written in the fixed area and it does not change during a data transfer. The count-up area is one that counts up upon completion of a data transfer for each word, and sequentially specifies all addresses in one area specified by the fixed area and returns to the leading address after reaching the last address. The outputs of these counters 106 and 107 are provided to the address MPX buffer 102, from which they are selectively provided on the address line of the transfer RAM 9 according to a control signal from the read/write control part 100.

When data to be transmitted (one word), read out of the transfer RAM 9, is set in the transmitting buffer 104 by the DMA transfer, a transmission control circuit 108 adds a start bit and a check bit to the transmission data and then sends it out as serial data. Upon completion of the transmission of the one-word data, the circuit issues a count-up command to the DMA address counter 106. When serial received data is set in the receiving buffer 105, a reception control circuit 109 checks its signal format (for example, a parity check, CRC check or the like) and requests the DMA address counter 107 to transfer the received data to the reception area of the transfer RAM 9 by the DMA transfer, counting up the content of the counter 107.

A priority control circuit 110 accepts DMA transfer requests from the DMA address counters 106 and 107, determines their priorities and requests the read/write control part 100 for DMA transfer.

Figure 4:
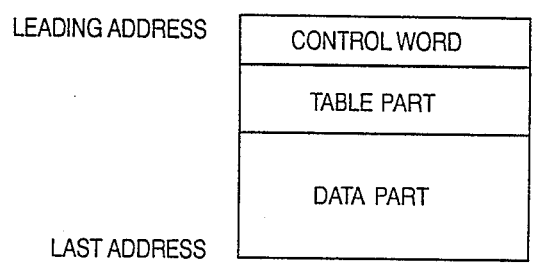
FIG. 4 is a diagram for explaining the format of transfer data.

A transfer data area (the transmission areas and reception areas of the transfer RAMs 9 and 27) uses the leading address as control word data, which is followed by a table part indicating the contents of transfer data, and then by a data part, as shown in FIG. 4. The data is of a shake-hand system which employs RDY (Ready) and ACK (Acknowledge) signals contained in the control word data. The table part contains information indicating what data is transferred in the data part and auxiliary information indicating the number of effective words of the data part, the data format (binary, ASCII code or the like) and, in the case where the data must be transferred a plurality of times, the page data concerned.

Figure 5:
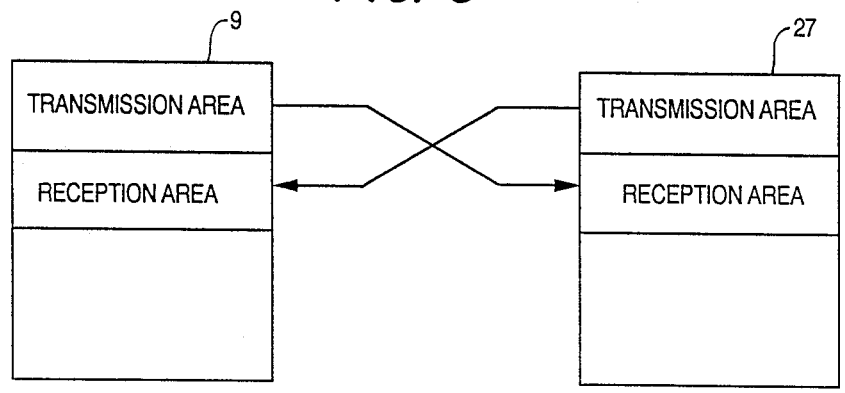
FIG. 5 is a diagram explanatory of RAMs 9 and 27 for transfer use.

FIG. 5 is a diagram showing the relationship between the transmission and reception areas of the transfer RAMs 9 and 27. The contents of the transmission area of the transfer RAM 9 are transferred to the reception area of the transfer RAM 27 with a predetermined period, and the contents of the transmission area of the transfer RAM 27 are transferred to the reception area of the transfer RAM 9 with a predetermined period.

Figure 6:
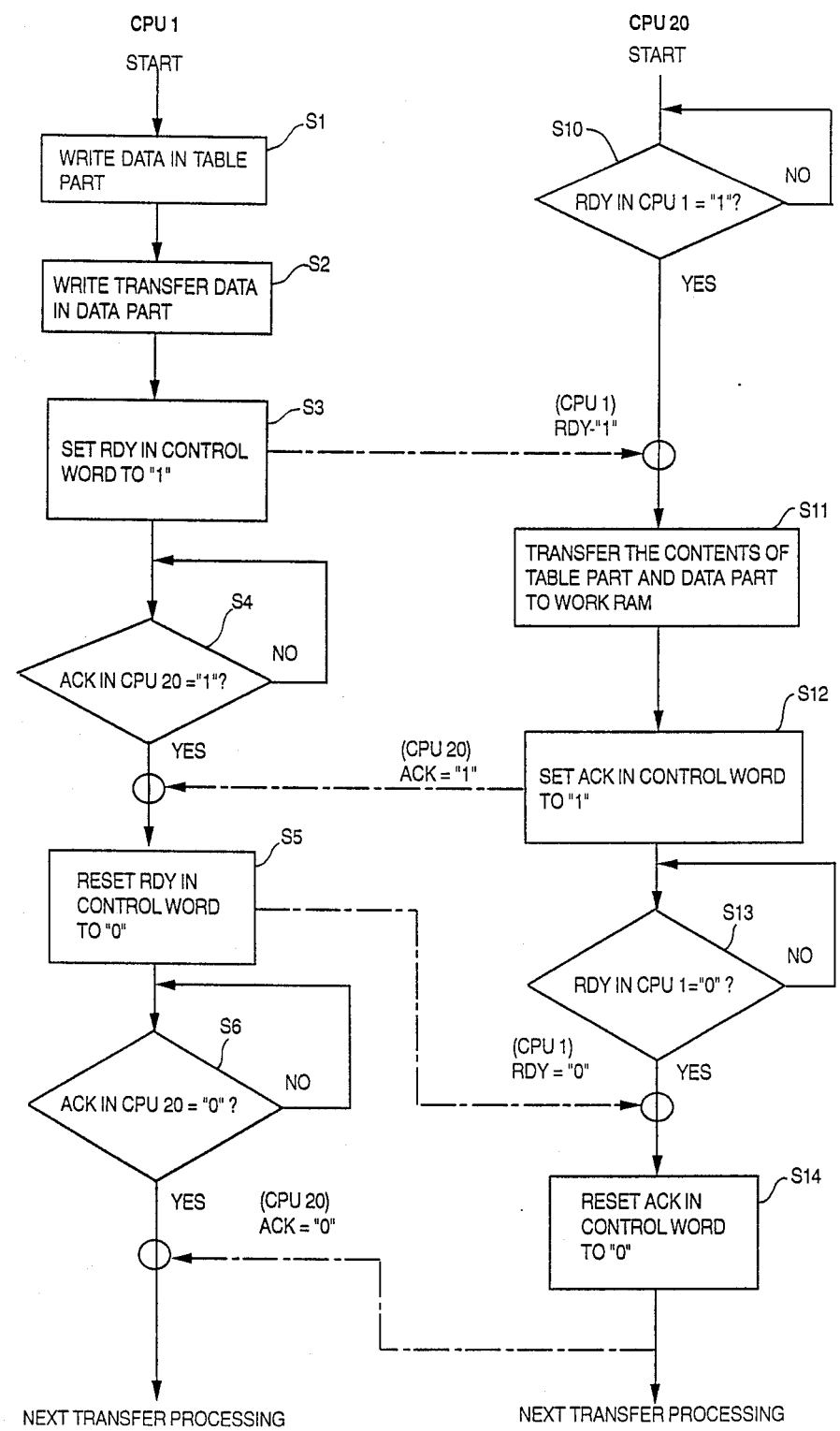
FIG. 6 is a flowchart showing an example of processing for a data transfer from a microprocessor 1 to a microprocessor 20.

FIG. 6 is a flowchart showing an example of processing for transferring data from the microprocessor 1 to the microprocessor 20. The microprocessor 1 writes in the table part of the transfer area of the transfer RAM 9 data corresponding to the data to be sent. At the same time, the microprocessor 1 writes the transfer data in the data part (S1, S2), sets the RDY signal in the control word at a "1" and checks whether or not the ACK signal in the control word of the reception area is a "1" (S4). When the RDY signal in the control word of the reception area of the transfer RAM 27 goes to a "1" (S10), the microprocessor 20 reads out the contents of the table part and data part of the reception area and transfers them to the RAM of the memory 24 (S11). Then the microprocessor 20 sets the ACK signal in the control word of the transmission area of the transfer RAM 27 to a "1" (S12). When the ACK signal in the reception area goes to a "1", the microprocessor 1 resets the RDY signal in the control word of the transmission area to a "0" (S5). Then the microprocessor 20 recognizes this (S13) and it resets the ACK signal in the control word of the transmission area of the transfer RAM 27 to a "0" (S14). The microprocessor 1 recognizes this and then proceeds to the next transfer process. The data transfer from the microprocessor 20 to the microprocessor 1 is also carried out in the same manner as described above.

The HSDCs 10 and 28 are not limited specifically to the configuration used in the above embodiment but may be of various systems.

As has been described in the foregoing, to the present invention is directed to a system for coupling a visual sensor processor which converts an image signal of a camera to digital information, extracts therefrom image information of an object and recognizes its position, shape, etc. and a robot controller which controls the movement of a robot according to the results of recognition by the visual sensor processor. The units are coupled together via a bidirectional high-speed data transfer channel over which they exchange required information, so that the processing speed of the whole system can be increased. Furthermore, since a nonvolatile memory for storing various programs and a serial interface for connection with an external input/output device, which are installed in the robot controller, are shaped by both units through utilization of the high-speed data transfer channel, the system configuration is economical.

We claim:

1. A system for coupling a visual sensor processor which converts an image signal of a camera to digital information, extracts therefrom image information of an object and recognizes its position and shape, and a robot controller which controls the movement of a robot in accordance with the results of recognition by the visual sensor processor, the robot controller including a non-volatile memory for storing visual sensor programs and visual sensor parameters, and a serial interface for connection to an external input/output device, said system comprising a bidirectional high-speed data transfer channel for coupling together the visual sensor processor and the robot controller for an exchange therebetween of the required information, said bidirectional high-speed data transfer channel including an optical data link, the non-volatile memory and the serial interface being shared between the robot controller and the visual sensor processor through utilization of said high-speed data transfer channel, so that the visual sensor programs and the visual sensor parameters are loaded from said non-volatile memory to said visual sensor processor.

2. A robot control system comprising:
 a visual sensor processor for converting a camera image signal of an object to digital information based on visual sensor programs and visual sensor parameters, for extracting image information from the digital information, the image information defining characteristics of the object including its position and shape;
 a bidirectional high-speed data transfer channel coupled to said visual sensor processor; and
 a robot controller, coupled to said bidirectional high-speed data transfer channel, for controlling the movement of a robot in accordance with the image information extracted by said visual sensor processor, said robot controller including:
 a non-volatile memory for storing the visual sensor programs and the visual sensor parameters; and
 a serial interface for connection to an external input/output device;
 said bidirectional high-speed data transfer channel including optical data communication means for providing an exchange of information between said visual sensor processor and said robot controller, said non-volatile memory and said serial interface being shared by said robot controller and said visual sensor processor through utilization of said high-speed data transfer channel, so that the visual sensor programs and the visual sensor parameters are loaded from said non-volatile memory to said visual sensor processor.

* * * * *